May 1, 1956     E. WIEDMANN     2,743,582
HYDRAULIC TRANSMISSION HAVING DITHERING MEANS
Filed Aug. 6, 1951     5 Sheets-Sheet 1

INVENTOR
ERNST WIEDMANN
BY
*Wesley P. Merrill*
ATTORNEY

May 1, 1956 E. WIEDMANN 2,743,582
HYDRAULIC TRANSMISSION HAVING DITHERING MEANS
Filed Aug. 6, 1951 5 Sheets-Sheet 2

INVENTOR
ERNST WIEDMANN
BY
*Wesley P. Merrill*
ATTORNEY

May 1, 1956 E. WIEDMANN 2,743,582
HYDRAULIC TRANSMISSION HAVING DITHERING MEANS
Filed Aug. 6, 1951 5 Sheets-Sheet 4

INVENTOR
ERNST WIEDMANN
BY
ATTORNEY

May 1, 1956 E. WIEDMANN 2,743,582
HYDRAULIC TRANSMISSION HAVING DITHERING MEANS
Filed Aug. 6, 1951 5 Sheets-Sheet 5
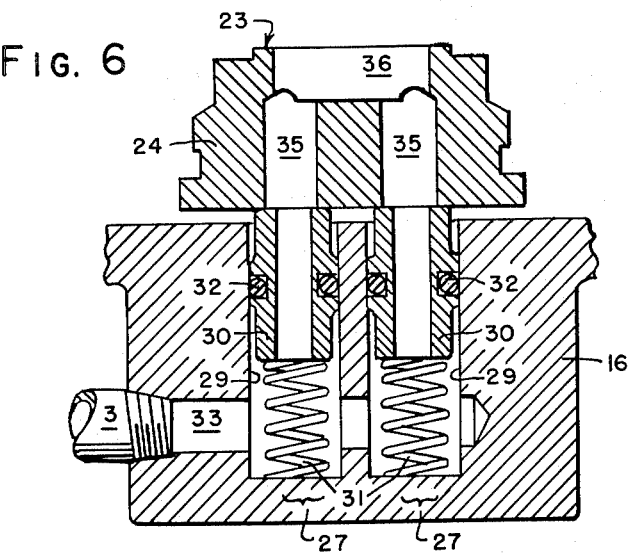
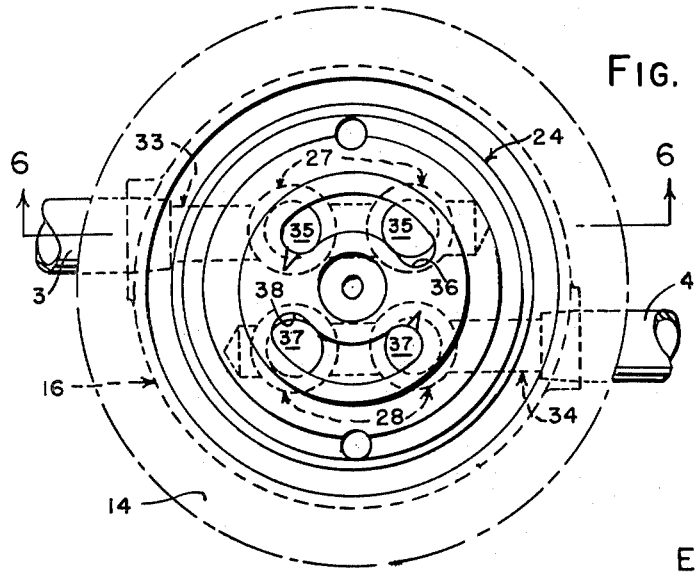
INVENTOR
ERNST WIEDMANN
BY
ATTORNEY

United States Patent Office 2,743,582
Patented May 1, 1956

2,743,582

HYDRAULIC TRANSMISSION HAVING DITHERING MEANS

Ernst Wiedmann, Summit, Wis., assignor to The Oilgear Company, Milwaukee, Wis., a corporation of Wisconsin Application August 6, 1951, Serial No. 240,593

12 Claims. (Cl. 60—53)

This invention relates to hydraulic transmissions of the type which include a hydraulic motor for moving a load, a pumping mechanism for delivering motive liquid to the motor to enable it to move the load, fluid channels which connect the motor to the pumping mechanism and form therewith a hydraulic circuit, flow control means for regulating the delivery of liquid to the motor and a control for effecting operation of the flow control means.

In a transmission of the above type, the motor tends to lag behind the control. That is, there is a very slight interval between the instant that the control is operated and the instant that the motor starts to respond to the control. This lag is due primarily to the inertia of certain movable parts and to the fact that, when the pumping mechanism is adjusted to increase its rate of delivery either from zero or from a previous rate, the motor will not start if idle nor accelerate if running until the pumping mechanism has compressed the liquid in one side of the hydraulic circuit to a pressure high enough to enable the motor to start and/or accelerate its load.

The present invention has as an object to provide a hydraulic transmission in which the motor will respond substantially instantly to operation of the control.

Another object is to provide a transmission which will move a load exactly to and hold it in a desired position.

Another object is to provide a transmission which will move each of a plurality of loads exactly to and hold it in a desired position.

Other objects and advantages will appear from the description hereinafter given of a transmission in which the invention is embodied.

According to the invention in its general aspect, small volumes of liquid are alternately withdrawn from and injected into the hydraulic circuit at a rapid rate to create in the circuit pulsations of pressure which maintain an intermittent high pressure in the circuit and set up vibrations in certain movable parts so that the motor can respond substantially instantly to operation of the control.

The invention is exemplified by the transmission shown in part diagrammatically in the accompanying drawings in which the views are as follows:

Fig. 5 is a transverse section taken on the line 5—5 of Fig. 2 but drawn to a larger scale and with certain parts omitted or broken away.

Fig. 6 is a section taken on a line 6—6 of Fig. 5.

Figure 1:
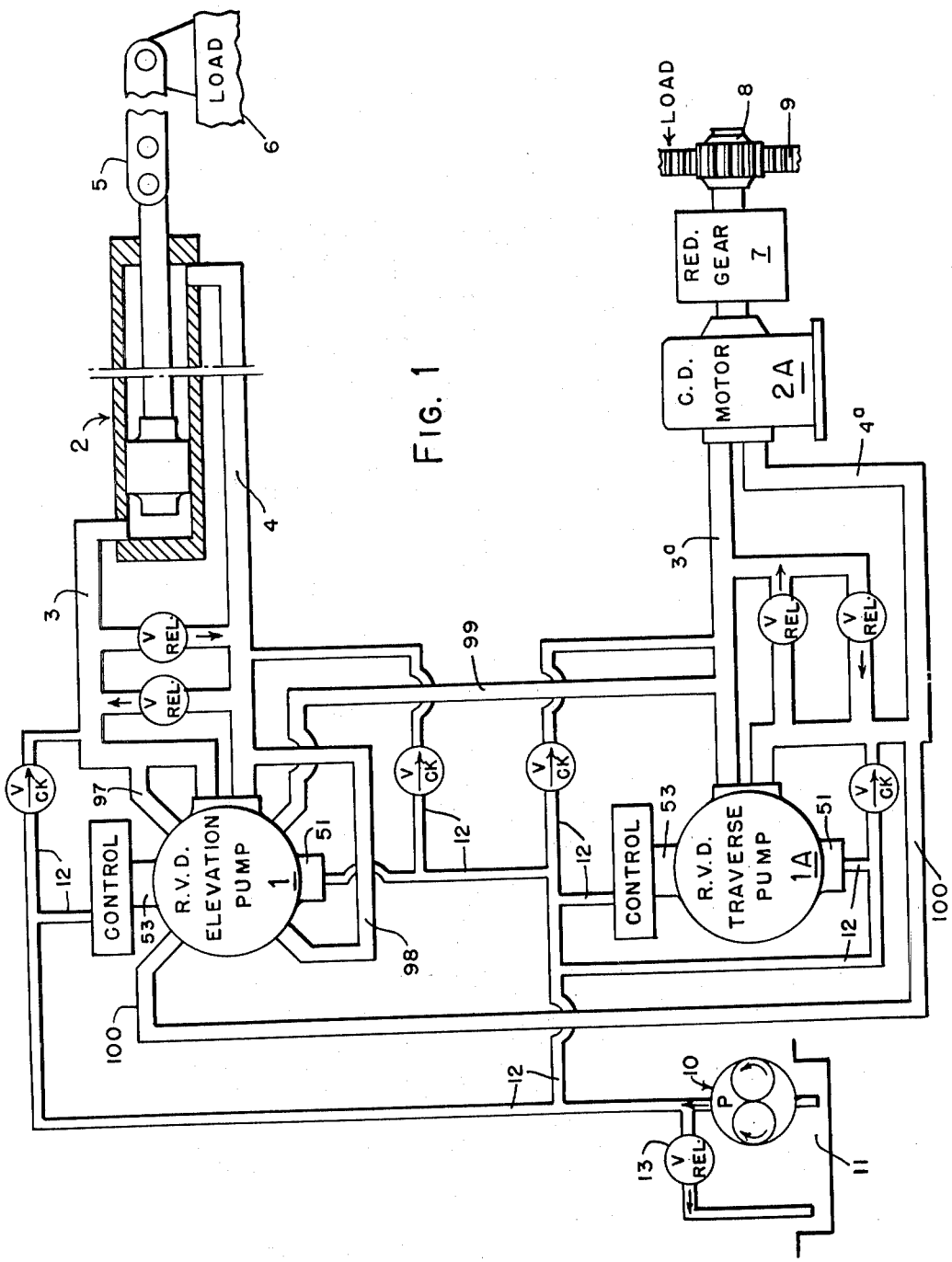
Fig. 1 is a diagram of the hydraulic circuit of a transmission in which the invention is embodied.
Figure 2:
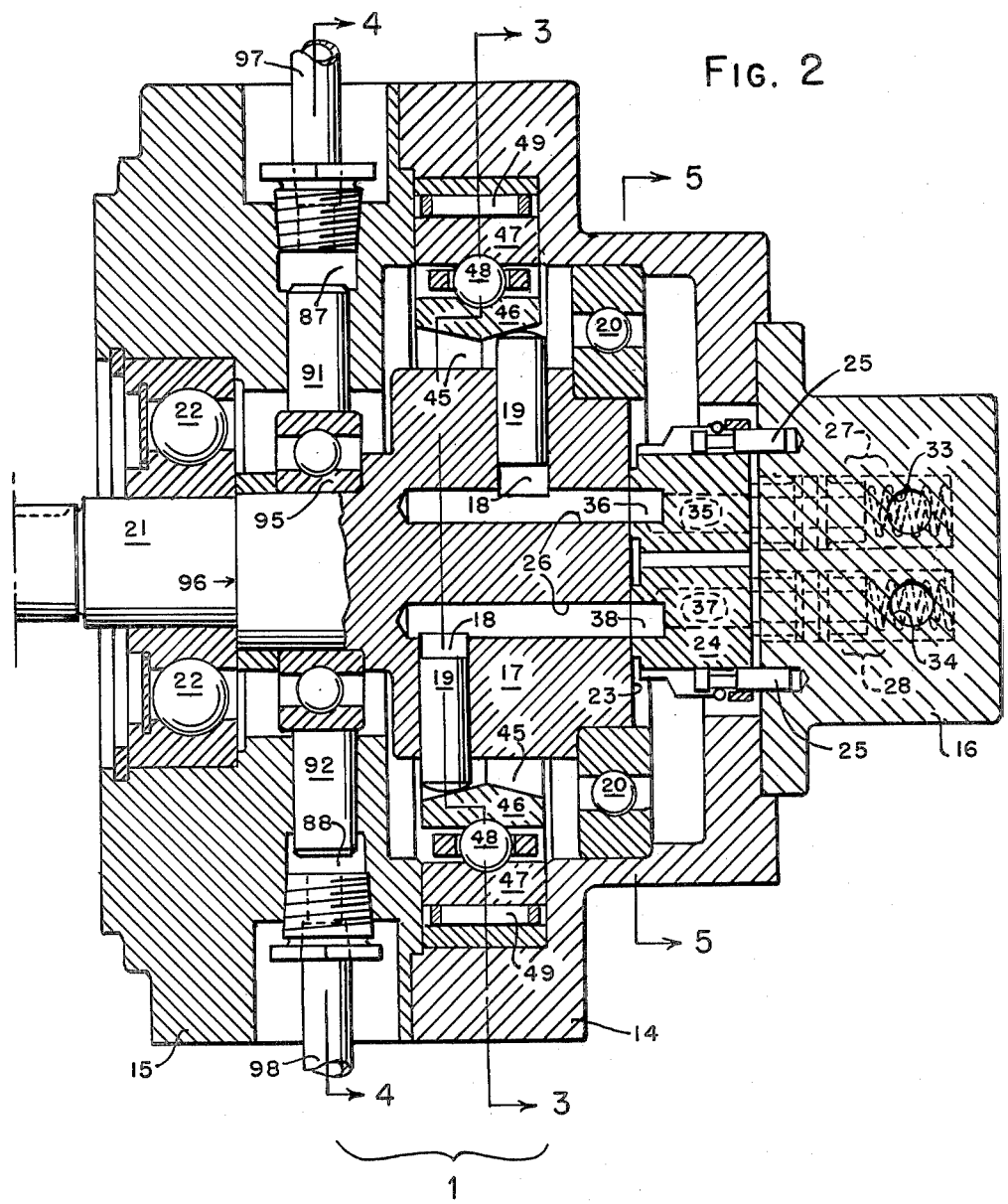
Fig. 2 is a longitudinal section through one of the pumping units shown in Fig. 1, the view being taken on the plane indicated by the line 2—2 of Fig. 3.

For the purpose of illustration, the invention has been shown embodied in a transmission for moving two separate loads independently of each other. As indicated in Fig. 1, the transmission includes a pump unit 1, a reciprocating hydraulic motor 2 which is connected to pump unit 1 by channels 3 and 4, a second pump unit 1A and a rotary hydraulic motor 2A which is connected to pump unit 1A by channels 3ᵃ and 4ᵃ. Motor 2 is connected by a linkage 5 to an element 6 which constitutes one of the two loads to be moved by the transmission. Motor 2A is connected through a reduction gear 7 and a pinion 8 to a rack 9 which constitutes the other load to be moved by the transmission.

Liquid for supercharging the hydraulic transmission and for control purposes is supplied by a gear pump 10 which draws liquid from a reservoir 11 and discharges it into a branched supply channel 12. Liquid discharged by pump 10 in excess of requirements is exhausted through a relief valve 13 which enables pump 10 to maintain a constant low pressure in channel 12. Gear pump 10 has been shown separate from pump unit 1A but it actually forms a part thereof as will presently be explained.

Referring now to Figs. 2–7, pump unit 1 includes a pumping mechanism for supplying liquid to motor 2 and a dithering mechanism for creating pressure impulses in the hydraulic circuit. As shown, the pumping mechanism is arranged within a casing 14 which is closed at its front end by a front head 15 containing the dithering mechanism and is closed at its rear end by a distributing block 16 to which channels 3 and 4 are connected.

The pumping mechanism includes a rotor or cylinder barrel 17 having a plurality of radial cylinders 18 arranged therein in one or more circular rows and a piston 19 fitted in each cylinder 18, two rows of pistons and cylinders being shown. Cylinder barrel 17 is rotatably supported at its rear end by a bearing 20 carried by casing 14 and at its front end it is fixed to or formed integral with a drive shaft 21 which is rotatably supported by a bearing 22 carried by head 15.

The rear end of cylinder barrel 17 is made flat and smooth to provide a valve seat 23 for a valve 24 which controls the flow of liquid to and from cylinders 18 and is supported by two pins 25 which are fixed in block 16 and are loosely fitted in valve 24 so that the face of valve 24, which is made flat and smooth, can adjust itself to seat 23 and form a substantially fluid tight joint therewith. Valve 24 controls communication between an external circuit and a plurality of passages 26 which extend into cylinder barrel 17 through valve seat 23 and each passage 26 communicates with one cylinder 18 in each of the circular rows of cylinders.

Valve 24 is urged against seat 23 by two hold-up motors 27, which are arranged in block 16 above the horizontal centerline of valve 24 in respect to Fig. 5, and by two hold-up motors 28 which are arranged in block 16 below that centerline. The four hold-up motors 27 and 28 are identical and each includes a cylinder 29 which is formed in block 16, a tubular piston 30 which is arranged within cylinder 29 and a spring 31 for urging piston 30 against valve 24 and a valve 24 against seat 23. Piston 30 is made slightly smaller in diameter than cylinder 29 so that it can tilt slightly therein and it has an "O-ring" packing 32 inserted into its peripheral surface to provide a fluid-tight seal between its periphery and the wall of the cylinder 29. The rear end of valve 24 and the front ends of pistons 30 are made flat and smooth to provide fluid-tight joints therebetween.

The cylinders 29 of hold-up motors 27 are connected to each other by a passage 33 to which channel 3 is connected and the cylinders 29 of hold-up motors 28 are connected to each other by a passage 34 to which channel 4 is connected. The opening through the piston 30 of each hold-up motor 27 registers with the rear end of a bore 35 which is formed in valve 24 and communicates at its front end with a valve port 36 which is formed in the front end or face of valve 24 and with which passages 26 register successively as cylinder barrel 17 rotates. Likewise, the opening through the piston 30 of each hold-up motor 28 registers with the rear end of a bore 37 which is formed in valve 24 and communicates at its front end with a valve port 38 which is formed in the front end or face of valve 24 and with which passages 26 register successively as cylinder barrel 17 rotates.

The outer ends or heads of the pistons 19 in each circular row engage an annular reaction surface 45 which is inclined to the piston axis and is formed upon a thrust ring 46 which is rotatably supported within a displacement varying member or slide block 47 by a bearing 48. Slide block 47 is arranged between two roller bearings 49 which permit it to be moved transversely of the axis of cylinder barrel 17 but prevent it from moving vertically in respect to Figs. 2 and 3, movement of slide block 47 axially of cylinder barrel 17 being prevented by casing 14 and front head 15.

Figure 3:
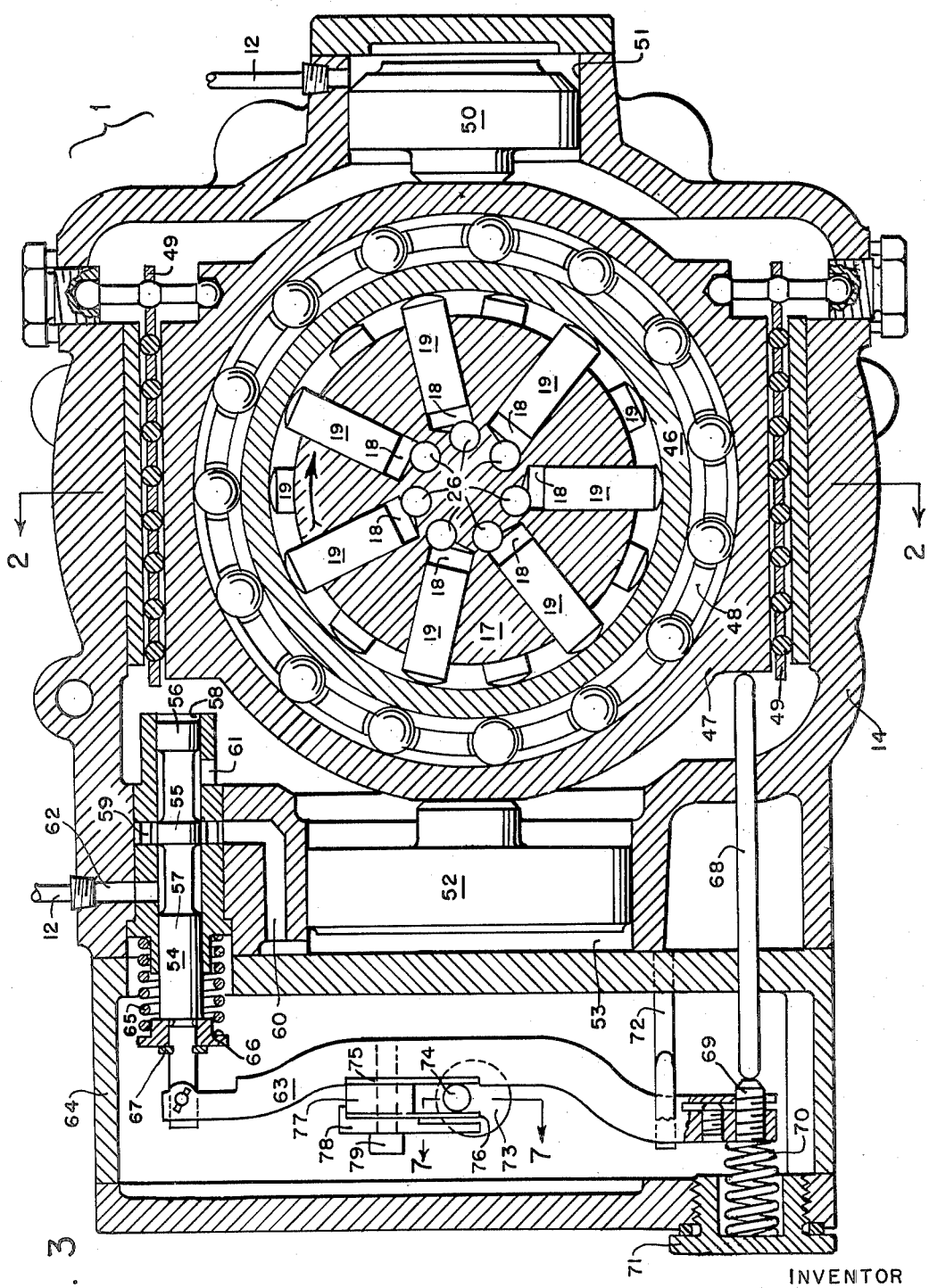
Fig. 3 is a transverse section taken on the irregular line 3—3 of Fig. 2.
Figure 4:
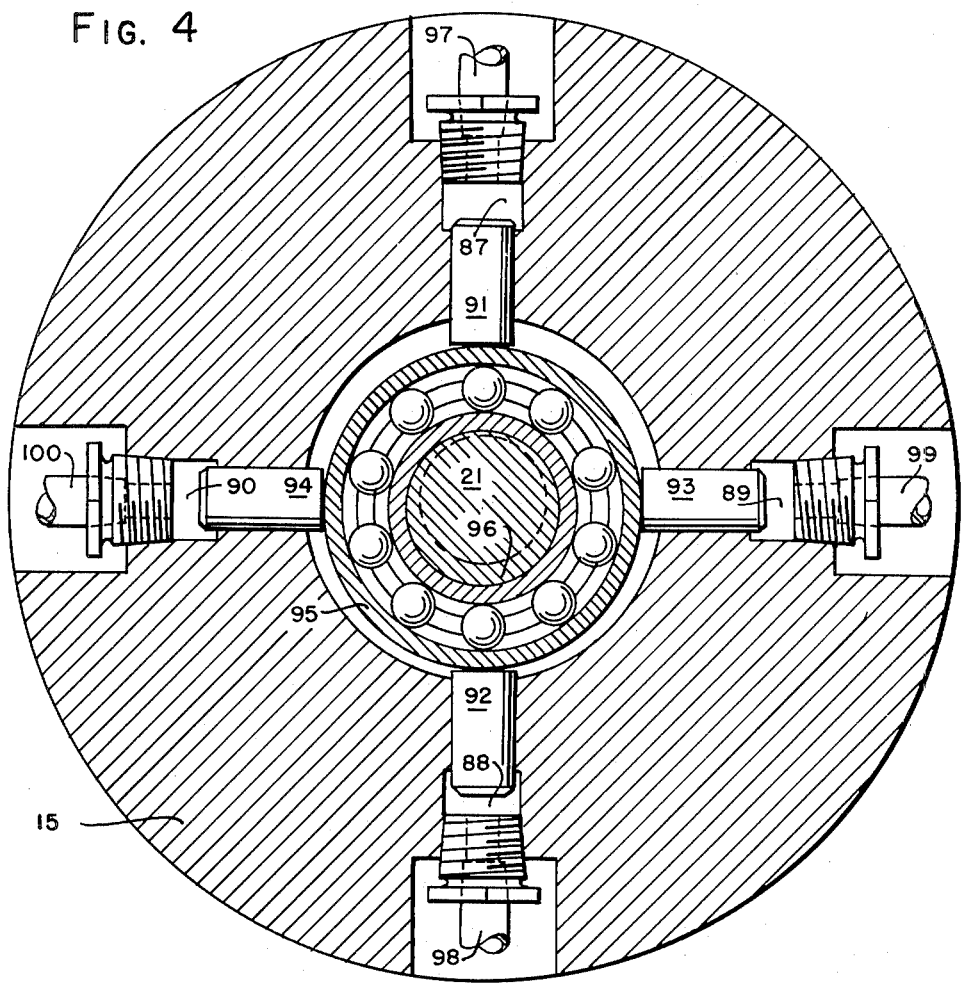
Fig. 4 is a transverse section taken on line 4—4 of Fig. 2.

The arrangement is such that, when cylinder barrel 17 is rotated in the direction of the arrow on Fig. 3 and the axis of slide block 47 is offset toward the left from the axis of cylinder barrel 17, the pistons 19 in the upper half of cylinder barrel 17 will be forced progressively inward by thrust ring 46 and the pistons 19 in the lower half of cylinder barrel 17 will be moved progressively outward by centrifugal force and by pressure created by gear pump 10. The inward moving pistons 19 will eject liquid from their cylinders 18 through the passages 26 in communication therewith, valve port 36, bores 35, hold-up motors 27, passage 33 and channel 3 to motor 2 and cause it to move load 6 toward the right. The pressure created by the inward moving pistons will act upon the rear ends of the pistons 30 of hold-up motors 27 and cause them to urge valve 24 against seat 23 with a force proportional to that pressure. The liquid ejected from motor 2 will flow through channel 4, passage 34, hold-up motors 28, bores 37, valve port 38 and passages 26 to the cylinders 18 containing outward moving pistons.

When cylinder barrel 17 is rotated in the direction of the arrow on Fig. 3 and the axis of slide block 47 is offset toward the right from the axis of cylinder barrel 17, the pistons 19 in the lower half of cylinder barrel 17 will be forced progressively inward and the pistons 19 in the upper half of cylinder barrel 17 will be moved progressively outward. The inward moving pistons 19 will eject liquid from their cylinders 18 through the passages 26 in communication therewith, valve port 38, bores 37, hold-up motors 28, passage 34 and channel 4 to motor 2 and cause it to move load 6 toward the left. The pressure created by the inward moving pistons will act upon the rear ends of the pistons 30 of hold-up motors 28 and cause them to urge valve 24 against its seat 23 with a force proportional to that pressure. The liquid ejected from motor 2 will flow through channel 3, passage 33, hold-up motors 27, bores 35, valve port 36 and passages 26 to the cylinders containing outward moving pistons.

Slide block 47 is continuously urged toward the left in respect to Fig. 3 by a servo-motor having a piston 50 engaging slide block 47 and fitted in a stationary cylinder 51 to which a branch of gear pump supply channel 12 is connected so that piston 50 is continuously subjected to the pressure created by gear pump 10.

Slide block 47 is adapted to be moved toward the right in respect to Fig. 3 by a servo-motor having a piston 52 engaging slide block 47 and fitted in a stationary cylinder 53 to which liquid from gear pump 10 is supplied under the control of a pilot valve 54. Piston 52 is considerably larger than piston 50 so that, when liquid is supplied to both of cylinders 51 and 53 at the same pressure, piston 52 can move slide block 47 toward the right against the force exerted by piston 50.

Pilot valve 54 has three spaced apart heads or pistons 55, 56 and 57 formed thereon and closely fitted in a bore 58 having formed in the wall thereof an annular groove or port 59 which is connected by a channel 60 to servo-motor cylinder 53. The space between pistons 55 and 56 communicates with a discharge port 61 which opens into the interior of casing 14. The space between pistons 55 and 57 communicates with a passage 62 to which a branch of gear pump supply channel 12 is connected so that that space is continuously supplied with liquid from gear pump 10.

Valve 54 normally occupies a neutral position in which piston 55 covers or substantially covers port 59 as shown. When valve 54 is moved from its neutral position toward the right in respect to Fig. 3, liquid will flow from supply channel 12 through passage 62, bore 58, port 59 and channel 60 into cylinder 53 and cause piston 52 to move slide block 47 toward the right in respect to Fig. 3. When valve 54 is moved toward the left from its neutral position, liquid can escape from cylinder 53 through channel 60, port 59, bore 58 and port 61 into casing 14 and thereby permit piston 50 to move slide block 47 toward the left.

Port 59 has been shown as being of the same width as piston 55 but in practice piston 55 has a negative lap. That is, piston 55 is made slightly (such as .002") narrower than port 59 to make pilot valve 54 more sensitive. A very slight movement of valve 54 away from its neutral position will permit liquid to flow into or escape from cylinder 53 at a limited rate and a greater movement will increase the rate of flow so that the speed at which slide block 47 is moved is determined by the distance valve 54 is moved from its neutral position.

Valve 54 is pivotally connected to the upper end of a floating lever 63 arranged within a control casing 64 which is attached to pump casing 14. Any lost motion in the mechanism for operating valve 54 is taken up by a spring 65 arranged between a stationary abutment, such as the sleeve in which bore 58 is formed, and a spring retainer 66 which is arranged upon the stem of valve 54 and is restrained from movement axially thereof by a snap ring 67.

The lower end of lever 63 is positioned by a push rod 68 which is slidable through the walls of casings 14 and 64 and has one of its ends in contact with slide block 47 and its other end in contact with an adjusting screw 69 threaded through the lower end of lever 63. Contact between screw 69 and rod 68 is maintained by a spring 70 arranged between the lower end of lever 63 and a plug 71 which is threaded through a wall of casing 64. Screw 69 is prevented from moving laterally out of engagement with rod 68 by a bar 72 having one of its ends fixed in a wall of casing 64 and its other end bifurcated and straddling lever 63 near the lower end thereof.

Lever 63 is adapted to be adjusted by a crankshaft 73 having a crank 74 formed thereon and positioned between the lower part of a wear plate 75, which is arranged upon lever 63 intermediate the ends thereof, and the lower part of a leaf spring 76 which holds crank 74 against plate 75. Spring 76 is spaced from plate 75 by a spacer block 77 arranged between the upper parts thereof. The outer face of spring 76 is engaged by a retainer plate 78 and the parts are held in the positions shown by a bolt 79 which extends through plate 78, spring 76, spacer 77 and plate 75 and is threaded into lever 63.

Figure 7:
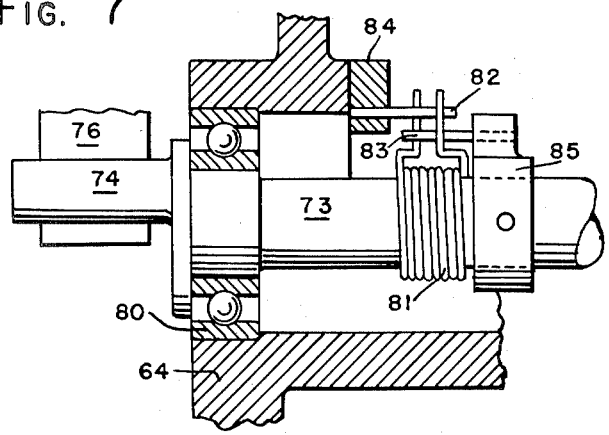
Fig. 7 is a view showing a shaft which forms a part of the control mechanism, the view being taken on the line 7—7 of Fig. 3 but drawn to a larger scale.

As shown in Fig. 7, the end of crankshaft 73 adjacent to crank 74 is rotatably supported by a bearing 80 carried by a part of control casing 64. Crank 74 normally occupies a neutral position as shown and it is yieldingly held in that position by a torsion spring 81 which encircles crankshaft 73 and has its ends arranged upon opposite sides of two pins 82 and 83. Pin 82 is arranged in a stationary position as by being fixed in a plate 84 carried by housing 64. Pin 83 is adapted to be revolved by shaft 73 as by being fixed in a collar 85 which is fastened upon shaft 73. The tension of spring 81 is such that its ends exert opposed forces upon opposite sides of pins 82 and 83 when crank 74 is in its neutral position.

The arrangement is such that, when shaft 73 is rotated in one direction or the other, pin 83 will move one end of spring 81 away from pin 82 and, when shaft 73 is released, spring 81 will rotate shaft 73 in the opposite direction until the moving end of spring 81 engages pin 82 at which time crank 74 will be in its neutral position. Shaft 73 is adapted to be rotated by a manually operated control mechanism not shown.

When shaft 73 is rotated in a clockwise direction in respect to Fig. 3, a crank 74 will move the upper end of lever 63 and pilot valve 57 toward the right because the lower end of lever 63 is initially held stationary by rod 68 and spring 70. Moving pilot valve 57 toward the right causes slide block 47 to move toward the right as previously explained. Moving slide block 47 toward the right permits spring 70 to move the lower end of lever 63 toward the right and, when rotation of shaft 73 ceases, lever 63 will pivot upon crank 74 and move pilot valve 57 to its neutral position, thereby stopping further movement of slide block 47 which thus has been moved a linear distance proportional to the angular distance through which shaft 73 was rotated.

When shaft 73 is released, spring 81 will rotate shaft 73 to its neutral position and crank 74 will move the upper end of lever 63 toward the left and thereby move pilot valve 57 to the left of its neutral position which will cause slide block 47 to move toward the left and to move the lower end of lever 63 toward the left. Lever 63 will pivot upon crank 74 and, when slide block 47 reaches its neutral position, it will have moved pilot valve 57 into its neutral position.

When shaft 73 is rotated in a counterclockwise direction and later released, the control will function in the above described manner except that pilot valve 57 and slide block 47 will first move toward the left and, when shaft 73 is released, they will move toward the right to their neutral positions.

Pump unit 1 also includes a dithering mechanism for generating pressure impulses. This mechanism includes a pair of dither cylinders 87 and 88 (Figs. 2 and 4) which are formed in front head 15 diametrically opposite each other, a pair of dither cylinders 89 and 90 which also are formed in front head 15 diametrically opposite each other, and four dither pistons 91, 92, 93 and 94 which are fitted in cylinders 87, 88, 89 and 90, respectively, and have the inner ends thereof in engagement with the outer race of a ball bearing 95 the inner race of which is fitted upon an eccentric 96 which is formed upon drive shaft 21.

The arrangement is such that, when shaft 21 is rotated, the pistons in each pair of dither cylinders will move in unison but in opposite directions. Cylinders 87, 88, 89 and 90 have channels 97, 98, 99 and 100 connected thereto respectively. The channels have been shown as extending radially outward from the dither cylinders but in practice they extend outward in different planes and the connection between casing 14 and its front head 15 is different from that shown. As shown in Fig. 1, channels 97 and 98 are connected to channels 3 and 4 respectively, and channels 99 and 100 are connected to channels 3ª and 4ª respectively.

Pump unit 1A is exactly the same as pump unit 1 except that it does not include a dithering mechanism but has gear pump 10 arranged in its front head instead of the dither mechanism. Therefore, illustration and description of pump unit 1A is unnecessary.

In practice, shaft 21 of pump unit 1 is driven at a speed of not less than 1000 R. P. M. when the pump units are in operation. Piston 91 will inject a small volume of liquid into channel 3 and an equal volume of liquid will flow from channel 4 into cylinder 88 during one-half of each revolution of shaft 21 and piston 92 will inject a small volume of liquid into channel 4 and an equal volume of liquid will flow from channel 3 into cylinder 87 during the other half of each revolution of shaft 21. Likewise, piston 93 will inject a small volume of liquid into channel 3ª and an equal volume of liquid will flow from channel 4ª into cylinder 90 during one-half of each revolution of shaft 21 and piston 94 will inject a small volume of liquid into channel 4ª and an equal volume of liquid will flow from channel 3ª into cylinder 89 during the other half of each revolution of shaft 21. Each volume of liquid injected into a channel creates a pressure impulse therein so that one thousand or more pressure impulses per minute are created in each of channels 3, 4, 3ª and 4ª.

The pressure impulses created in channels 3 and 4 extend into cylinders 18 of the pumping mechanism of pump unit 1 and cause the pistons 19 therein to tend to move slide block 47 in opposite directions alternately thereby causing slide block 47 to vibrate. Movement of slide block 47 is resisted by servo-motor pistons 50 and 52 but the liquid in cylinders 51 and 53 is under a low pressure and, hence, it may be compressed slightly. The vibrations set up in slide block 47 are transmitted through rod 68, screw 69 and lever 63 to pilot valve 54 which causes pilot valve 54 to vibrate slightly and thereby be far more sensitive than if it were stationary. The movements transmitted to slide block 47 are infinitesimal but are sufficient to keep the film of oil between each piston 19 and its cylinder 18 and the film of oil between each of pistons 51 and 52 and its cylinder in motion so that slide block 47 is ready to move the instant that pilot valve 54 is shifted. The pressure impulses created in channels 3ª and 4ª extend into the pumping mechanism of pump unit 1A and have the same effect thereon.

The pressure impulses created in channels 3 and 4 also compress the liquid in opposite sides of the circuit alternately which causes the liquid to exert force upon opposite ends of the piston of motor 2 alternately and cause it and the connection between it and load 6 to vibrate and to exert alternate pulling and pushing forces upon load 6. Likewise, the pressure impulses created in channels 3ª and 4ª also compress the liquid in opposite sides of the circuit alternately which causes the liquid to rotate the rotor of motor 2A through limited angular distances alternately which enables motor 2A to vibrate pinion 8 and the mechanism of reduction gear 7 which causes pinion 8 to tend to move rack 9 in opposite directions alternately.

The result is that load 6 will start to move almost instantly in response to operation of the control for pump unit 1 and rack 9 will start to move almost instantly in response to operation of the control for pump unit 1A.

The transmission ordinarily is employed in a military tank in which cause the volume of liquid injected into a circuit by a dither piston is not sufficient to cause either load 6 or rack 9 to actually move but preferably the volume is great enough to increase the pressures in the hydraulic circuits almost high enough to enable the motors to start the loads thereon.

The invention herein set forth is susceptible of various modifications and adaptations without departing from the scope thereof which is hereby claimed as follows:

1. A hydraulic transmission comprising a hydraulic motor, a pump for supplying liquid to said motor to energize the same and having a drive shaft for connection to a source of power, fluid channels connecting said motor to said pump and forming therewith a hydraulic circuit, means for controlling the delivery of liquid from said pump to said motor, a dither cylinder connected to each side of said circuit, a dither piston fitted in each of said cylinders and adapted during reciprocation thereof to pump limited volumes of liquid out of and into the side of the circuit to which its cylinder is connected, and an eccentric arranged upon said shaft for reciprocating said pistons at high speed to cause them to pump in opposite phase and thereby create pulsations of high frequency and of opposite phase in opposite sides of said circuit.

2. A transmission for moving a load, comprising a hydraulic motor, a mechanical connection between said motor and said load to enable said motor when energized to move said load, pumping means for supplying liquid to said motor to energize the same, fluid channels connecting said motor to said pumping means and forming therewith a hydraulic circuit, means independent of said circuit for controlling the delivery of liquid from said pumping means to said motor, an auxiliary pump connected to both sides of said circuit to maintain said circuit completely filled with liquid, a dither cylinder connected to each side of said circuit, a dither piston fitted in each of said cylinders and adapted during reciprocation thereof to pump limited volumes of liquid out of and into the side of the circuit to which its cylinder is connected, and means driven with said pumping means for so reciprocating said pistons at high speed as to cause them to pump in opposite phase and thereby create in opposite sides of said circuit pulsations which are of high frequency and of opposite phase and which set up vibrations in said pumping means, said motor and said mechanical connection.

3. A hydraulic transmission comprising a hydraulic motor, pumping means for supplying liquid to said motor to energize the same and including a displacement varying member normally occupying a neutral or zero displacement position, fluid channels connecting said motor to said pumping means and forming therewith a hydraulic circuit, means independent of said circuit for shifting said member in one direction or the other from said neutral position to cause said pumping means to discharge liquid in one direction or the other and thereby cause said motor to operate in one direction or the other, a dither cylinder connected to each side of said circuit, a dither piston fitted in each of said cylinders and adapted during reciprocation thereof to pump limited volumes of liquid out of and into the side of the circuit to which its cylinder is connected, and means driven with said pumping means for so reciprocating said pistons at high speed as to cause them to pump in opposite phase and thereby create in each side of said circuit high frequency pulsations which vibrate said member and the movable parts of said motor.

4. A transmission for moving a load, comprising a hydraulic motor, a mechanical connection between said motor and said load to enable said motor when energized to move said load, pumping means for supplying liquid to said motor to energize the same and including a displacement varying member normally occupying a neutral or zero displacement position, fluid channels connecting said motor to said pumping means and forming therewith a hydraulic circuit, means independent of said circuit for shifting said member in one direction or the other from said neutral position to cause said pumping means to discharge liquid in one direction or the other and thereby cause said motor to operate in one direction or the other, an auxiliary pump connected to both sides of said circuit to maintain said circuit completely filled with liquid, a dither cylinder connected to each side of said circuit, a dither piston fitted in each of said cylinders and adapted during reciprocation thereof to pump limited volumes of liquid out of and into the side of the circuit to which its cylinder is connected, and means driven with said pumping means for so reciprocating said pistons at high speed as to cause them to pump in opposite phase and thereby create in opposite sides of said circuit pulsations which are of opposite phase and high frequency and which set up vibrations in said pumping means, said motor and said mechanical connection.

5. A transmission comprising a first hydraulic motor and a second hydraulic motor, a pump for supplying liquid to said first motor to energize the same, fluid channels connecting said pump and said first motor and forming therewith a first hydraulic circuit, pumping means for supplying liquid to said second motor to energize the same, fluid channels connecting said second motor to said pumping means and forming therewith a second hydraulic circuit, a first pair of dither cylinders connected to opposite sides of said first circuit, a second pair of dither cylinders connected to opposite sides of said second circuit, a dither piston fitted in each of said cylinders, and means driven in unison with said pump for reciprocating said pistons at high speed to cause a limited volume of liquid to be alternately withdrawn from and ejected into each side of each of said circuits to thereby create high frequency pulsations in the liquid therein.

6. A transmission comprising a first hydraulic motor and a second hydraulic motor, a pump for supplying liquid to said first motor to energize the same, fluid channels connecting said pump and said first motor and forming therewith a first hydraulic circuit, pumping means for supplying liquid to said second motor to energize the same, fluid channels connecting said second motor to said pumping means and forming there with a second hydraulic circuit, a first pair of dither cylinders connected to opposite sides of said first circuit, a second pair of dither cylinders connected to opposite sides of said second circuit, a dither piston fitted in each of said cylinders, a shaft for driving said pump, and means driven by said shaft for reciprocating said pistons at high speed to cause a limited volume of liquid to be alternately withdrawn from and ejected into each side of each of said circuits to thereby create high frequency pulsations in the liquid therein.

7. A transmission for moving two separate loads, comprising a first hydraulic motor and a second hydraulic motor, mechanical connections between said motors and said loads respectively to enable each motor when enerigzed to move one of said loads, a pump for supplying liquid to said first motor to energize the same, fluid channels connecting said pump and said first motor and forming therewith a first hydraulic circuit, pumping means for supplying liquid to said second motor to energize the same, fluid channels connecting said second motor to said pumping means and forming therewith a second hydraulic circuit, an auxiliary pump connected to both sides of both of said circuits to maintain said circuits completely filled with liquid, a first pair of dither cylinders connected to opposite sides of said first circuit, a second pair of dither cylinders connected to opposite sides of said second circuit, a dither piston fitted in each of said cylinders and adapted during reciprocation thereof to pump limited volumes of liquid out of and into the side of the circuit to which its cylinder is connected, and means driven in unison with said pump for so reciprocating said pistons at high speed as to cause the pistons in each pair of cylinders to pump in opposite phase and thereby create in opposite sides of each of said circuits pulsations which are of high frequency and of opposite phase and which set up vibrations in said pump, said pumping means, said motors and said mechanical connections.

8. A transmission for moving two separate loads, comprising a first hydraulic motor and a second hydraulic motor, mechanical connections between said motors and said loads respectively to enable each motor when energized to move one of said loads, a pump for supplying liquid to said first motor to energize the same, fluid channels connecting said pump and said first motor and forming therewith a first hydraulic circuit, pumping means for supplying liquid to said second motor to energize the same, fluid channels connecting said second motor to said pumping means and forming therewith a second hydrauiic circuit, an auxiliary pump connected to both sides of both of said circuits to maintain said circuits completely filled with liquid, a first pair of dither cylinders connected to opposite sides of said first circuit, a second pair of dither cylinders connected to opposite sides of said second circuit, a dither piston fitted in each of said cylinders and adapted during reciprocation thereof to pump limited volumes of liquid out of and into the side of the circuit to which its cylinder is connected, a shaft for driving said pump, and means driven by said shaft for so reciprocating said pistons at high speed as to cause the pistons in each pair of cylinders to pump in opposite phase and thereby create in opposite sides of each of said circuits pulsations which are of high frequency and of opposite phase and which set up vibrations in said pump, said pumping means, said motors and said mechanical connections.

9. A hydraulic transmission comprising a hydraulic motor, a pump having a displacement varying member, means for driving said pump, fluid channels connecting said pump to said motor and forming therewith a hydraulic circuit, hydraulic means independent of said circuit for shifting said member in opposite directions selectively to vary pump displacement, means for supplying liquid to said hydraulic means to energize the same including a pilot valve to control operation thereof, means for shifting said pilot valve to thereby cause said hydraulic means to shift said member, a dither cylinder connected to each side of said circuit, a dither piston fitted in each of said cylinders and adapted during reciprocation thereof to pump limited volumes of liquid out of and into the side of the circuit to which its cylinder is connected, and means driven with said pump for reciprocating said dither pistons at high speed in opposite phase to cause them to create in opposite sides of said circuit pulsations of high frequency and of opposite phase which vibrate said displacement varying member and the movable parts of said motor.

10. A transmission according to claim 9 in which said pump and said dither pistons and cylinders are combined into a single unit and said pump is driven by a shaft having thereon an eccentric for reciprocating said dither pistons.

11. A hydraulic transmission comprising a hydraulic motor, a pump having a displacement varying member, means for driving said pump, fluid channels connecting said pump to said motor and forming therewith a hydraulic circuit, hydraulic means for shifting said member in opposite directions selectively to vary pump displacement, means for supplying liquid to said hydraulic means to energize the same including a pilot valve to control operation thereof, means for shifting said pilot valve to thereby cause said hydraulic means to shift said member, follow-up means for transmitting motion from said member to said pilot valve, a dither cylinder connected to each side of said circuit, a dither piston fitted in each of said cylinders and adapted during reciprocation thereof to pump limited volumes of liquid out of and into the side of the circuit to which its cylinder is connected, and means for reciprocating said dither pistons at high speed and in opposite phase to cause them to create in opposite sides of said circuit pulsations of high frequency and of opposite phase which cause said displacement varying member to vibrate and to transmit vibrations through said follow-up means to said pilot valve.

12. A transmission according to claim 11 in which said pump and said dither pistons and cylinders are combined into a single unit and said pump is driven by a shaft having thereon an eccentric for reciprocating said dither pistons.

References Cited in the file of this patent
UNITED STATES PATENTS

| | | |
|---|---|---|
| 2,350,117 | Kline | May 30, 1944 |
| 2,434,653 | Holschuh et al. | Jan. 20, 1948 |
| 2,447,707 | May | Aug. 24, 1948 |
| 2,475,313 | Davis | July 5, 1949 |
| 2,528,645 | Edwards | Nov. 7, 1950 |
| 2,550,671 | Chinn | May 1, 1951 |
| 2,550,966 | Buchanan | May 1, 1951 |

FOREIGN PATENTS

| | | |
|---|---|---|
| 493,697 | Great Britain | Oct. 10, 1938 |